United States Patent
Delgado Rodriguez

(10) Patent No.: US 10,329,675 B2
(45) Date of Patent: Jun. 25, 2019

(54) ELECTROCHEMICAL REACTOR FOR PRODUCING OXYHYDROGEN GAS

(71) Applicant: Luis Alfonso Delgado Rodriguez, Zapopan (MX)

(72) Inventor: Luis Alfonso Delgado Rodriguez, Zapopan (MX)

(73) Assignee: Luis Alfonso Delgado Rodriguez, Zapopan (MX)

( * ) Notice: Subject to any disclaimer, the term of this patent is extended or adjusted under 35 U.S.C. 154(b) by 294 days.

(21) Appl. No.: 15/114,845

(22) PCT Filed: Jan. 31, 2014

(86) PCT No.: PCT/MX2014/000037
§ 371 (c)(1),
(2) Date: Jul. 28, 2016

(87) PCT Pub. No.: WO2015/115881
PCT Pub. Date: Aug. 6, 2015

(65) Prior Publication Data
US 2016/0333487 A1 Nov. 17, 2016

(51) Int. Cl.
*C25D 17/12* (2006.01)
*C25B 9/04* (2006.01)
(Continued)

(52) U.S. Cl.
CPC ............... *C25B 1/06* (2013.01); *C25B 9/06* (2013.01); *C25B 15/08* (2013.01); *Y02E 60/366* (2013.01)

(58) Field of Classification Search
CPC ........ C25D 17/12; C25D 17/008; C25B 1/04; C25B 9/18; C25B 9/04; C25B 9/00
(Continued)

(56) References Cited

U.S. PATENT DOCUMENTS 3,310,483 A 3/1967 Rhodes
6,338,786 B1 1/2002 Thorpe et al.
(Continued)

FOREIGN PATENT DOCUMENTS

CN 201318230 Y 9/2009
JP 2004-307878 A 11/2004
(Continued)

OTHER PUBLICATIONS

International Searching Authority, International Search Report (ISA210) for International Application No. PCT/MX2014/000037 dated Oct. 1, 2014 (6 pages).

*Primary Examiner* — Zulmariam Mendez
(74) *Attorney, Agent, or Firm* — Feeney Law Group; Alan F. Feeney

(57) ABSTRACT

The invention concerns an electrochemical reactor or modular unit designed to obtain a pure gas mixture of hydrogen and oxygen through the water electrolysis process. The electrochemical reactor includes a containment cabinet that is defined by four walls which form a prismatic cube with a base, and it is open at its upper surface. Within it, a number of conductive or semi-conductive plates are housed in parallel and insulated from each other, connecting all the cells by means of soldered electric connection, located at the ends of the cube, as well as other devices used for the dehumidification of gas and the refrigeration of condensed water. Its internal configuration is designed to allow for easy replenishment of water, while maintaining the isolation of the cells during operation. The abovementioned electrolysis occurs inside the cube.

22 Claims, 10 Drawing Sheets

(51) Int. Cl.
*C25B 9/00* (2006.01)
*C25B 1/04* (2006.01)
*C25B 1/06* (2006.01)
*C25B 9/06* (2006.01)
*C25B 15/08* (2006.01)

(58) Field of Classification Search
USPC .................................... 204/271, 280, 286.1
See application file for complete search history.

(56) References Cited

U.S. PATENT DOCUMENTS

| | | |
|---|---|---|
| 8,168,047 B1 | 5/2012 | Smith |
| 2012/0103796 A1 | 5/2012 | Taruya et al. |

FOREIGN PATENT DOCUMENTS

| | | |
|---|---|---|
| KR | 20020088467 A | 11/2002 |
| KR | 20130005339 A | 1/2013 |
| WO | WO2011/158153 A1 | 12/2011 |
| WO | WO2012/049689 | 4/2012 |
| WO | WO2012/056751 A1 | 5/2012 |
| WO | WO2013/069164 | 5/2013 |

ELECTROCHEMICAL REACTOR FOR PRODUCING OXYHYDROGEN GAS

CROSS-REFERENCE TO RELATED APPLICATION

This application is the U.S. national phase of PCT Application No. PCT/MX2014/000037 filed on Jan. 31, 2014, the disclosure of which is incorporated in its entirety by reference herein.

FIELD OF THE INVENTION

This invention refers to an electrochemical reactor for the production of oxyhydrogen, specifically into a prismatic structure, the primary objective is to generate a mixture of hydrogen and oxygen gas, in a 2 to 1 ratio, from water and electric power, the mixture is produced on demand, and it is not stored.

BACKGROUND OF THE INVENTION

The widest used energy in the world is fossil fuels. If everything that is at stake is taken into consideration, it is of the utmost importance to accurately calculate the reserves of fossil fuels of the planet. Some relevant reserves are "identified reserves" and "probable reserves"; the latter ones are reserves that might be discovered with future technologies. According to calculations, the planet can provide 40 more years of power if only petroleum is used, and more than 200 years if coal continues to be used.

Fossil fuels can be used in the form of a solid (coal), liquid (oil) or gas (natural gas). These fuels are accumulations of living beings that lived millions of years ago, and these were fossilized into coal or hydrocarbons. In the case of coal, it is from forests in swampy areas, and in the case of petroleum and natural gas, it is from large masses of marine plankton that accumulated at the bottom of the sea. In both cases, organic matter was partially decomposed due to a lack of oxygen and the effect of temperature, pressure and certain bacteria which lead to the creation of molecules with high-energy bonds.

Renewable energies have been an important part of the energy used by humans ever since ancient times, especially solar, wind and hydraulic sources of energy. With the invention of the steam engine by James Watt these forms of exploitation were abandoned because they were considered as unstable in time and capricious, and thermal and electric motors were increasingly used. At a time when there was still a relatively low consumption, it was not necessary to envisage the depletion of sources nor other environmental problems that were later occurred.

During the decade of the 70s, renewable energies were considered an alternative to traditional energy sources, both for its guaranteed present and future availability (unlike fossil fuels that take thousands of years to be created), as well as due to their lower environmental impact in the case of clean energies, and for this reason, they were called alternative energies. Currently, many of these energies are a reality.

This is where this invention lies, which derives from research, development manufacture, promotion, and use of oxyhydrogen gas generators, also called Brown's gas in honor of its discoverer Yull Brown. The gas is used as a fuel for any application in which this fuel is feasible, instead of fossil fuels or in combination with the latter.

In different countries, there are many researchers who attempt to develop models of hydrogen generators with high efficiency and high gas production characteristics Various designs, forms, materials, construction parameters, concentrations of electrolyte, and chemicals used as electrolyte exist; yet, the constant struggle continues to be in maintaining the efficiency of equipment.

Research was conducted to determine the state of the technique, and the following documents were found: U.S. Pat. No. 6,338,786 B1 of Steven J. Thorpe et. al. presented on 16 Jul. 1999, which refers to an improved method of separation of hydrogen gas produced with a first aqueous electrolyte solution of a water electrolysis device for the production of said hydrogen and oxygen gas, entrained with a second aqueous electrolyte solution. The production of hydrogen gas comprises two phases; in a first phase, discharge a flow of electrolytic solution; conduct a second flow discharge of two phases of this oxygen gas within said solution; feeding the first discharge into a separation chamber that has a first part that includes a chamber for hydrogen that is used to separate this hydrogen gas from this first discharge; then feeding said second discharge to a separation chamber that has a second part with a chamber for oxygen to carry out the separation of this oxygen gas from the second discharge; collect the hydrogen gas from the hydrogen chamber; collect the oxygen gas from the oxygen chamber; collect the gas from the first discharge; collect the gas from the second discharge. The improvement is that at least one of the first discharges is discharged in the hydrogen chamber and said discharge is discharged into an oxygen chamber.

It is noted that a disadvantage of this device is that it requires too flows of electrolytic solution; i.e. a first one for hydrogen and a second one for oxygen.

Another disadvantage found is that the device requires two chambers. A first separation chamber that has one part that includes a chamber for hydrogen; a second separation chamber that has a part that includes a chamber for oxygen and the means to collect gases.

Another disadvantage is that the optimal type of electrolyte, which is used to generate high quality oxyhydrogen in order to avoid current leakage between the electrodes, is not mentioned.

US Patent 20120103796 A1 of Kenji Taruya et. al. filed on 22 Sep. 2011, which refers to a water electrolysis system that includes an electrolysis apparatus for water at high pressure and a gas-liquid separation device, was also found. The gas-liquid separation device includes a blocking member an opening for gas-liquid separation and an opening used to detect the water level. The opening for gas-liquid separation and the opening for water level detection extends vertically and includes respective lower portions that communicates a single piece with a discharge tube. The discharge tube is placed at a lower position on the side of the blocking element. The opening used to detect the water level includes an upper part and a section to detect the upper-water-level. The block member also includes an intake hole where hydrogen enters from the apparatus for electrolysis of water at high pressure. The entry hole is located at the upper side portion of the block element. The intake orifice is located above the section for upper-water-level detection of the opening used for water level detection.

A disadvantage of this device was found to be that it does not reveal the electrolyte composition.

Another disadvantage is that the water electrolysis device, which is used in the production of hydrogen gas, uses a solid polymer electrolyte membrane (ionic exchange membrane), instead of a liquid electrolyte, to break down the waters Another disadvantage is that the water electrolysis system has a cylindrical glass body, which can easily break due to the material type.

Another disadvantage is that the device has a metal block component with an opening which is used to accommodate the glass body; the type of metal is highly corrosive, and this requires constant servicing.

The international publication WO 2012056751 A1 made by Toshiaki Suzuki regarding the request that was submitted on 8 Apr. 2011, which makes reference to a water electrolysis device with excellent treatment capacity for water electrolysis without to increasing the size of the device or incurring in higher equipment cost, was also found. The publication concerns supplying fuel in a manner that is inexpensive, safe, and environmentally friendly through the use of a water electrolysis device. This water electrolysis device is configured to electrolyze water in an electrolytic that surrounds a number of electrode pads to produce a gas mixture of hydrogen and oxygen. It discharges the generated gas mixture, in which the electrolytic solution temperature is detected through the temperature of the electrolytic solution. Also, the number of electrode plates that contribute to the electrolysis between the plurality of electrode pads increase or decrease depending on the temperature of the electrolyte solution detected through the temperature of the electrolyte solution.

It is found that said device has a spiral plastic spring that pushes the electrode plates that are located in the inner ends of the plurality of electrodes. This implies that these pads need to be manufactured with a greater thickness so that they do not break; this pushing means that the plates must be continuously cheeked to see its functionality.

Another disadvantage is that the cooling system consists of cooling pipe and a cooling fan at both ends of the cooling pipe. This makes it very slow, and therefore, cooling of the device is less efficient because it is cooled by air.

U.S. Pat. No. 8,168,047 B1 of Jerry Smith, Littleton, which was filed on 29 Oct. 2008, was also found. It refers to an HHO electrolysis cell mounted on a vehicle that is used to generate hydrogen. The hydrogen is mixed with the fuel supply of a vehicle for greater fuel savings.

The electrolysis cell includes a housing of the cell for the retention of water. A plurality of positive electrode plates mounted inside the housing of the cell and joins a positive post mounted on the top of the housing of the cell. The positive post has been adapted so that it can be connected to the power source of an electric vehicle. A plurality of negative electrode plates is mounted inside the housing and indexed in a separation ratio between each one of the plates of positive electrodes. The plates of negative electrodes are associated with a negative post mounted on the top of the housing of the cell. The negative post is also adapted so that it cars be connected to the power source of an electric vehicle. The plates of negative electrodes are to attached to a mobile plate rod mounted inside the housing of the cell. One end of the mobile bar has been adapted so that it can be fixed to an articulation set connected to the fuel system of a vehicle. As the vehicle accelerates, the rod moves the negative plates toward the positive plates, thus increasing the amount of water electrolysis in the housing of the cell and therefore the increase of the amount of hydrogen generated therein. The hydrogen is discharged into a port of hydrogen fuel at the top of the housing of the cell for the feel system.

This device has the disadvantage of requiring a vehicle to be put into action and cause a rotation that moves a bar which in turn moves the negative plates toward the positive plates, thus increasing the amount of the electrolysis of the water in the housing of the cell and therefore, increasing of the amount of hydrogen generated.

Another disadvantage is that the rotational movement requires constant monitoring in order to perform timely preventive and corrective maintenance on the bar and plates that rotate because these frequently deteriorate over short time periods. Another disadvantage is that it was exclusively designed to be coupled with internal-combustion vehicles for fuel reduction purposes.

The international application WO 2012049689 A2 of Thakore Pratik, submitted on 10Oct. 2011, was also found. It proposes a driver to regulate the production of detonating water gas with an arrangement of electrolyte modules with electrodes that have asymmetric ventilation. The electrolyte has electrodes with an asymmetrical or non-linear arrangement of water inlet ventilation for the water flow at the lower level. The water inlet vents have a smaller proportion than those of the outlet diffusers. The gas outlet diffusers with an asymmetric or non-linear arrangement for gas flow at the top level of the electrodes in the electrolyte cell unit are arranged in alternating bipolar electrodes in the form of a tube. The asymmetric ventilation orifices are arranged at the maximum distance between the GOV (gas outlet vent) and water regulating vent (WRV) in the same electrode tube of shape of the plate to avoid current leakage between electrodes.

The asymmetric layout does not allow the flow of water between the electrode plate in a single line and non-linear asymmetric layout; it does not allow the gas flow in a single line. Therefore, the overall efficiency increases and heat loss is reduced. This eliminates the need for a temperature control system. The electrolyte device is in a modular series form, and the combination in parallel with the electronic controller that is used to supply DC power through switching frequency of power transistors in order to regulate the gas discharge that is needed for various applications.

The disadvantage of this device is that it can only be supplied with direct current in order for it to carry out its function.

Also enclosed is Patent Application WO 2011158153 (A1), of Fong Sze Chun and Lam Chi Long Daniel of Jun. 15, 2011 which basically consists of a system designed to make the combustion of engines more efficient through four stages. The first is the acquisition of data from the internal combustion engine injection through at least one sensor, such as the MAP/MAF/Oxygen/TPS; the second stage transforms this data so that it can finally be used in the third stage to take controlling actions by modifying the fuel injection into the engine and the injection of oxyhydrogen originating from a generating unit with stainless steel electrodes and electrolyte, where its temperature, pressure, and fluid level are monitored and regulated. The information is transmitted to the user with status indicators about the system. On the other side, the system connects through some sort of computer or additional electronic system in order to visualize the parameters of the oxyhydrogen generator and the motor sensors and so the installer can manipulate the configuration of the control unit and the generator to set the oxyhydrogen flow.

The system sends a maintenance warning due to gas leakage detected by a sensor because the cooling system does not work (composed of a liquid recirculation pump and a fan for a thermal radiator), due to levels of pressure outside of range or if the filling system does not properly function.

Finally, this invention considers a fuel optimization method (algorithm) by modifying fuel injection based on parameters from motor sensors.

It is important to note that this method uses a motor invasive method since the original injectors of the motor have to be modified to introduce the oxyhydrogen.

Contrary to the aforementioned document, this invention is not a motor invasive method because it does not require modified any fundamental aspect of the motor, and can be applied to many other applications thanks to its programmable electronic control.

Also, the original signals from the sensors and the injectors of the ECU of the combustion motor are not modified in order to operate. This invention generates a much larger volume of oxyhydrogen gas.

This reactor design has a different form of electrodes, arrangement, and way of filling itself with water.

The need to have an electrochemical reactor for a highly efficient gas production led to this invention. It achieves a large, high quality gas production of up to 12 LPM. That is, this occurs with a low content of water vapor due to the design of the reactor and the electronic sensors that are interpreted by the electronic control, which is able to keep the reactor operating at optimal work parameters.

OBJECTIVES OF THE INVENTION

The main objective of this invention is to have a single or modular electrochemical reactor to produce oxyhydrogen or oxygen from water and electric energy, controlled by an electronic system that regulates the supply to the reactor which directly modifies the production of oxyhydrogen with the capacity to program operating parameters such as temperatures, pressure, electric usage, log of acquisition times in a removable a digital storage device, safety system against interruption of gas flows, a system shutdown mechanism which stops the internal combustion engine, and regulation of oxyhydrogen flow as a function of revolutions per minute (RPM) of the motor in this niche application.

Another objective of this invention is to provide a modular electrochemical reactor to allow lower operating costs, while also reducing consumption of traditional fossil fuels, and even in some applications replacing 100% of them.

Another objective of this invention is to provide a modular electrochemical reactor that reduces gas contaminant emissions and thus reduces the greenhouse effect, since the only emission produced by burning hydrogen gas is water vapor.

Another objective of the invention is to optimize the internal combustion in engines that use fossil fuels.

Another objective of the invention is to adapt the reactor to engines that use any type of fossil fuel, converting it into a hybrid engine that uses oxyhydrogen, without modifications to already established systems.

Another objective of this invention is to provide a modular electrochemical reactor that produces a high hydrogen gas flow at high efficiency, ensuring reliability and safety during operation of the system.

BRIEF DESCRIPTION OF THE INVENTION

The invention concerns art electrochemical reactor or modular unit designed to obtain a pure gas mixture of hydrogen and oxygen through the water electrolysis process. The electrochemical reactor includes a containment cabinet that is defined by four walls which form a prismatic cube with a base, and it is open at its upper surface. Within it, a number of conductive of semi-conductive plates are housed in parallel and insulated from each other, connecting all the cells by means of soldered electric connection, located at the ends of the cube, as well as other devices used for the dehumidification of gas and the refrigeration of condensed water. Its internal configuration is designed to allow for easy replenishment of water, while maintaining the isolation of the cells during operation. The abovementioned electrolysis occurs inside the cube.

The electrochemical reactor has a design that allows loading and unloading water very easily and precisely compared to the levels of the cells, it also comes with security mechanisms that are incorporated in such a way to allow the reactor to work optimally within the established and configured ranges. Similarly, it is equipped with a set of safety cylinders that prevent ignition of gas and allow for a filtering process of oxyhydrogen gas from residual electrolyte particles, it also comprises a level sensor that informs the user when the water level should be filled. Similarly, the reactor consists of multiple special sensors interconnected with an electronic control system, which carries out readings and regulates the electrical power supply of the reactor.

The electrochemical reactor generates a mixture of hydrogen and oxygen gas in a 2 to 1 ratio from water and electricity. This gas mixture is produced on demand, which means that the gas is not stored in any medium and its design can generate a gas flow up 12 Liters per Minute (LPM), with a maximum electrical consumption of 1.85 KW and a yield of 1720 liters of oxyhydrogen per liter of water. This operational efficiency is achieved due to the chemical and electric insulation of internal cells, as well as of the included multiple special sensors: electrolyte temperature, electrolyte level, gas pressure, electric current and temperature of the power module, as well as inputs for measuring voltage, identifying the integrity of the gas ducts and the acquisition of the RPM of an engine (in certain applications), all of which is interconnected with an dynamic electronic controlling system that performs readings, and based on the obtained parameters, it regulates the electric power of the reactor through its power stage, thus maintaining constant efficiency, a high durability of the materials that make up the reactor, allowing it to make a recording of the data obtained and especially to provide flexibility in the system with certain working parameters, according to the type of application, ultimately thanks to its user interface.

Its internal configuration is designed to allow easy and optimized water resupply, as this will continuously be exhausted in the dissociation process, while maintaining the insulation of the cells during operation due to the reactor seal cap, among other factors.

Regarding the security of the system, on the one hand, it is supplied by the electronic system together with sensors that are incorporated into the design, allowing the reactor to work under optimal parameters of operation within the set and configured ranges. In addition, it includes safety cylinders that are designed to contain any gas ignition, and at the same time, it allows to filter residual electrolyte particles from the oxyhydrogen gas from. The latter safety systems also include a level sensor that informs the user when they must be maintained by filling them with water.

The system of this invention can be adapted to be useful in internal combustion engines and the automobile industry as a supplement to increase fuel efficiency and reduce carbon emissions. Also, if can be applied in various industries, such as an additive gas in furnaces and incinerators, the neutralization of atomic waste, etc.

Other advantages of the electrochemical reactor for oxyhydrogen production, in accordance with the invention as described, are listed below:

It has a good level of component integration, enabling it to save space in order to be easily in various applications, which also allows it to be modular so that the equipment can be interconnected with multiple reactors; thus, high yields of oxyhydrogen gas can be generated.

It has a high production capacity of oxyhydrogen gas per module (up to 12 LPM).

It has a design that allows for easy maintenance of the reactor, especially for the high-wear parts, which are the electrodes that must be replacement at the end of their useful lifespan.

It offers optimal availability and internal block connections of cells. This has a direct relationship with the qualify of the gas produced (Fuel/steam cell).

It includes an electronic control for the regulation of the reactor supply that directly modifies the production of oxy hydrogen, based on the sensors and measuring inputs, allowing for the possibility of programming the reactor's operating parameters such as temperature pressure, electric consumption, and others such as acquisition time and data logging on a removable memory, safety systems to prevent disruption of gas flows, a system shutdown mechanism which stops the internal combustion engine and the regulation of the oxy hydrogen flow in terms of revolutions per minute (RPM) of the engine in this niche of applications, all of the above in order to achieve optimum system performance.

It can collect statistics of system use during operating hours by storing the data in a file to be displayed on a computer and reprogram the system.

It offers a very easy to use and innovative user interface, for users to be aware at all times of the status of the system, and at the same time to configure the machine.

Finally, it is important to note that this reactor is designed to be modular, which means it allows multiple reactors to function together to obtain much higher oxyhydrogen flows according to the requirements of the specific application on which the system will be installed.

BRIEF DESCRIPTION OF THE FIGURES

FIG. 10 shows a conventional perspective of the containment cabinet of the electrochemical reactor, showing two of the walls to illustrate the arrangement of the electrodes and electrical connection rods.

Figure 1:
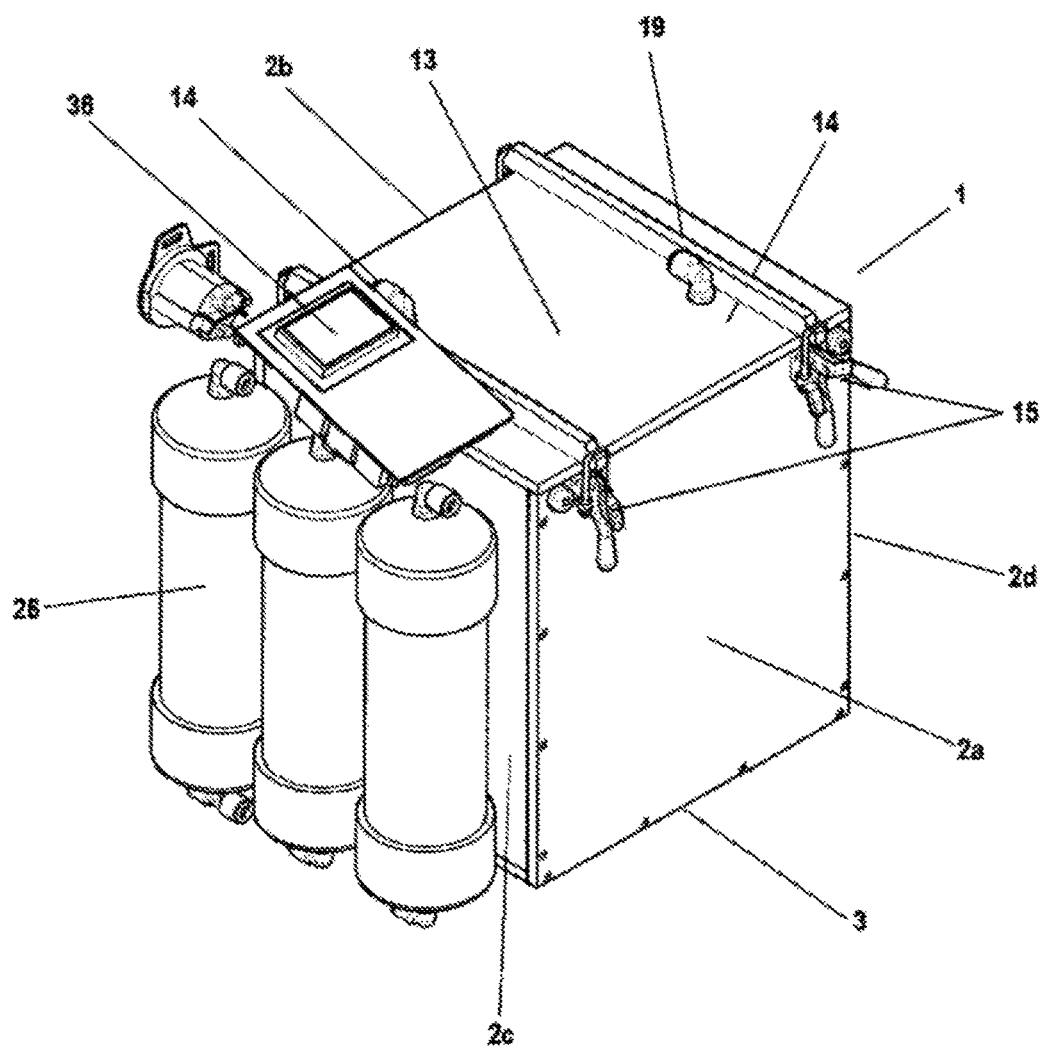
FIG. 1 shows a conventional perspective view of the electrochemical reactor for oxyhydrogen production, in accordance with the present invention

Then, in order to better understand the invention, a detailed description of the modalities thereof will be made as shown in the drawings that are annexed to this description for illustrative purposes.

DETAILED DESCRIPTION OF THE INVENTION

Figure 2:
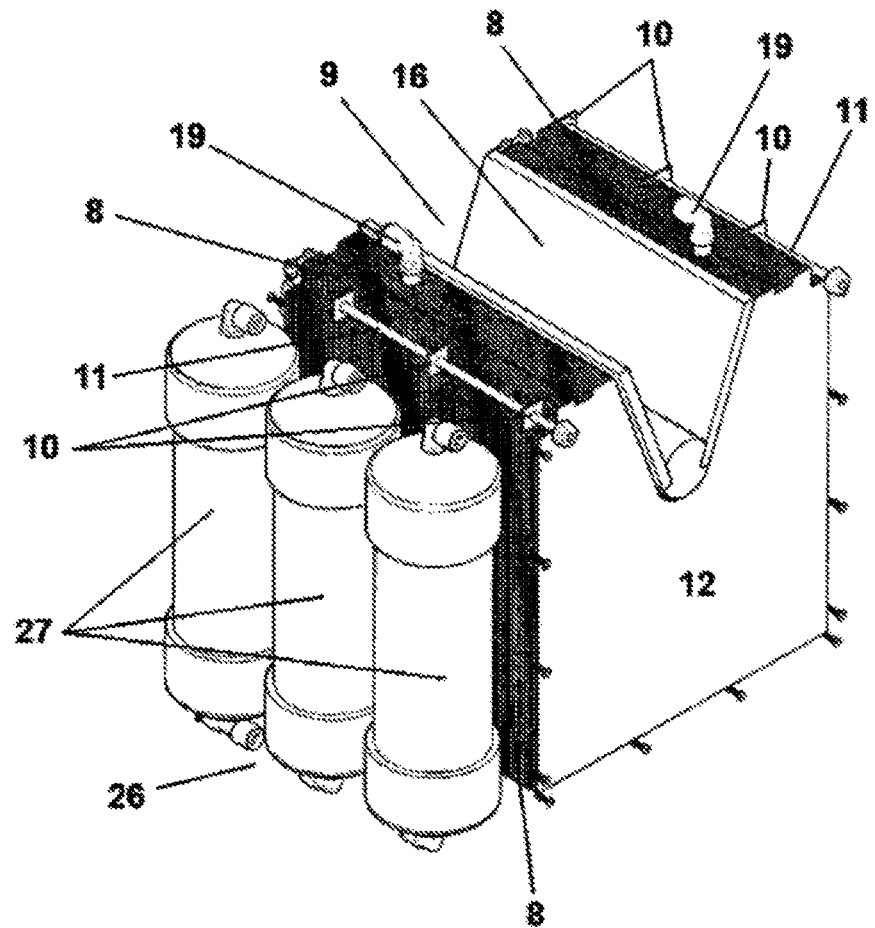
FIG. 2 shows a conventional perspective view of the electrochemical reactor for oxyhydrogen production, in the absence of the external containment cabinet, showing the internal components according to the present invention.
Figure 3:
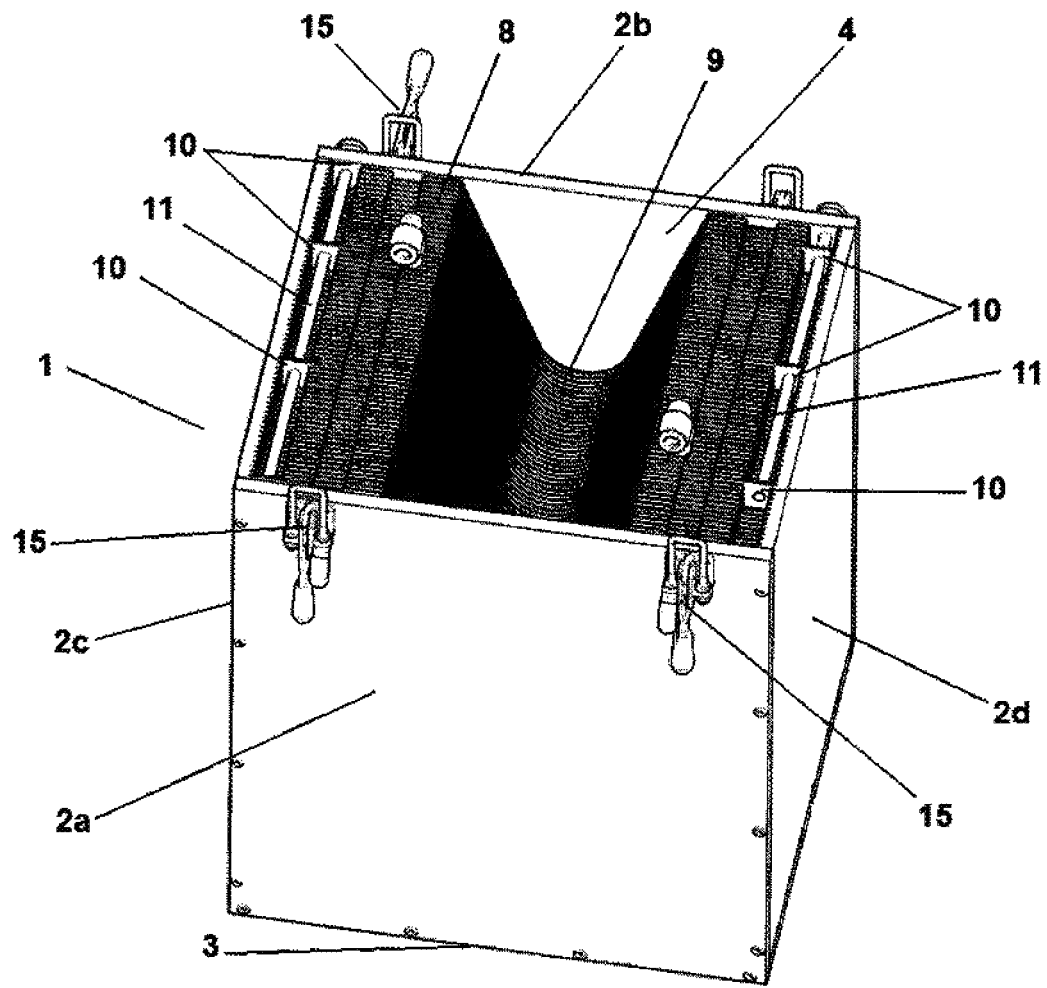
FIG. 3 shows a top perspective of the containment cabin reactor for oxyhydrogen production, in the absence of the upper covering cap, showing the arrangement of the electrodes.

With reference to FIGS. 1 to 3, the electrochemical reactor used to produce oxyhydrogen, in accordance with this invention, consists of a container defined by four perimeter walls 2*a*, 2*b*, 2*c* and 2*d*, a wall at the bottom 3 and an open top side 4, which form a prismatic cube that holds electrolytic solution (water and catalytic converter). At least two opposing perimeter walls 2*c*, 2*d* and the bottom wall 3 include on their internal face a number of equidistant grooves 5 (see FIG. 7) configured in a manner which makes it possible to slide in a several electrochemical plates 8. These are predominantly rectangular and are placed in a parallel distribution with a preferable separation of 3 mm between each plate that allows for contact to be made with the electrolyte solution (water and catalyst) used in the water dissociation reaction.

These electrochemical plates 8 touch the bottom wall 3 and these touch at least two opposing perimeter walls 2*c* and 2*d* covering the interior space of the container 1 and which include a central groove in the shape of a "V" 9 at the top edge; the vessels are then communicated in this recess because when they are filled with electrolytic solution, the fluid is transferred from a cell (defined as a space between plate and plate) to the other when the solution overflows, in the absence of an upper cover 13 and when a cover is placed on top, the communication between vessels when the solution overflows is stopped because the cover seals and isolates all cells to maintain the efficiency and eliminate electrical losses, alternating electrochemical plates 8 are fixed 10 (soldered) at both ends of the top edge to hold a couple of copper rods for electrical connections 11 fed by a supply source of electrical power (not shown); each subset of electrochemical plates 8 (formed by the block of plates that are between two plates with connecting means to the electrical connection rods) isolated from each other by neoprene gaskets 12 with the same shape of said electrochemical plates, which is essential to obtain a production of high qualify gas, without water vapor, since it isolates each set of electrochemical plates among themselves regarding electromagnetic aspects that directly affect the water dissociation process. These neoprene gaskets separate these aforementioned cell blocks into cell subsets such that, in reality, each plate with a connection to the rod is formed by two plates with a gasket in the middle of these two plates.

The number of electrochemical plates 8, as well as the electrical connections thereto am made according to the application and the voltage to be used (direct current DC or alternating current AC that is rectified and pre-filtered). The cells, which are conformed by two electrodes and the conductive electrolyte solution between them, behave as a voltage divider for electron flow. Thanks to this feature, it is possible to regulate and configure this potential difference that exists in each cell (space between electrode and electrode), which is preferably established at 2.21 volts according to multiple tests.

In the preferred modality of the invention, the catalyst of electrolytic solution is preferably potassium hydroxide (KOH) with a 99% purity, and at their concentration, which was established to be 7.79% by mass of the total mass of the mixture, which results in water becoming a great electrical conductor with a low electrical resistance. By becoming a good catalyst, it does not intervene in the reaction. Therefore, it is a component that is not consumed, and it only degrades after prolonged times of operation due to a effect, which will require replacing it.

For applications in diesel machinery, with a 24 V system operating at approximately 27 V. for example, subsets of thirteen electrochemical plates 8 are placed with electrical connection via the electrical connecting copper rods 11 that are soldered to some electrochemical plates with phosphor copper. The intermediate plates are neutral. In order to obtain a potential difference in each cell as close as possible to 2.21 V, each module with the mentioned characteristics should be capable of generating 2.7 to 4 liters per minute (LPM) of gas, depending on the working temperature. In this manner, the number of cells of the reactor are calculated in accordance with their application.

Figure 4:
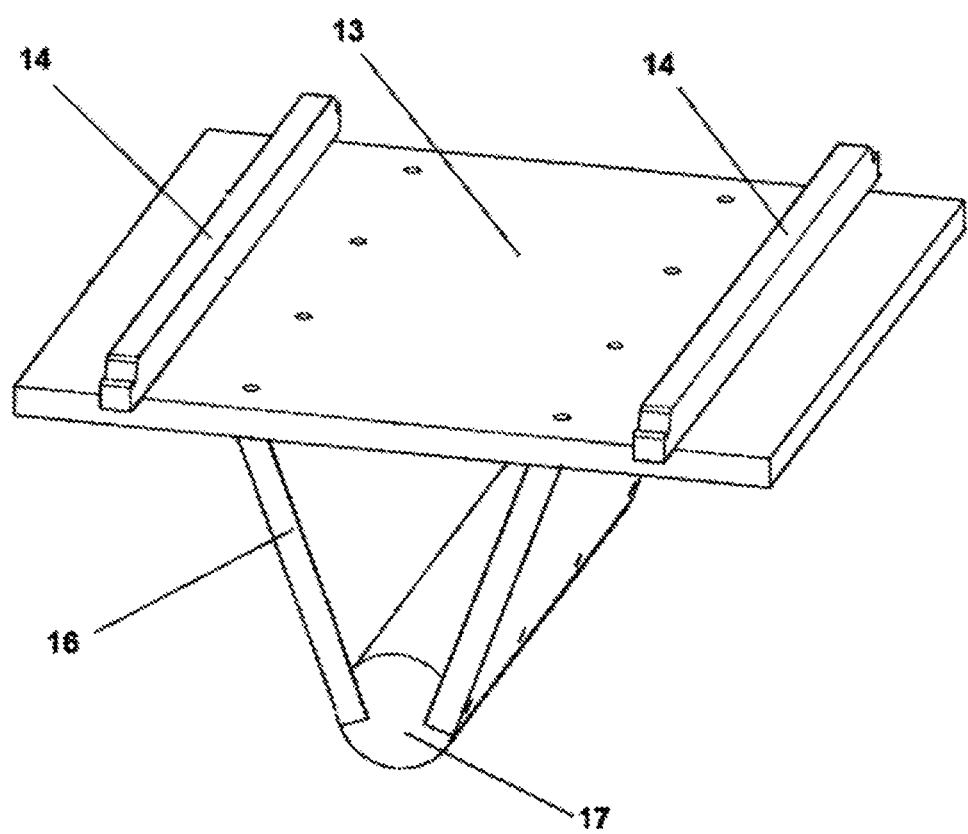
FIG. 4 shows a top view of the upper covering cap of the containment cabinet of the electrochemical reactor with an electric insulation structure housed inside the cabinet.

With reference to FIGS. 1 and 4, an upper cover 13 is fixed at the top of the container 1, covering the open upper side 4, it is perfectly set to close the electrochemical reactor: said top cover 13 includes on its upper face at least one structural reinforcement bar 14 (preferably two parallel structural reinforcement bars 14) and its lower face consists of a triangular projection 16 that defines a "V" shape with a cylindrical body 17 in the vertex; where said triangular projection 16 is placed in the area defined by the central grooves in the shape of a "V" 9 at the upper edge of the electrochemical plates 8, acting as an internal isolation element in such a way that the cells are isolated, even when foam is generated due to the reaction, which guarantees maintaining high efficiency when using electrical energy during the dissociation process.

Fastening means 15 mounted on the top of those opposing perimeter walls 2a and 2b adapted to firmly hold the top cover 13. These means of fastening 15 consists preferably of clamps which exert a sealing force between the top cover 13 and the top edge of its perimeter walls 2a, 2b, 2c and 2d, using a neoprene gasket on the perimeter (not shown), facilitating the hermetic seat to contain and direct the discharge of the oxyhydrogen and to make opening easy, the foregoing without requiring a tool to perform these operations to close and open.

In the preferred mode of the invention, these electrochemical plates 8 are preferably composed of an alloy of 0.03% carbon, 16 to 18% chromium, 10 to 14% nickel, and 2 to 3% of molybdenum for properly producing gas and a long useful life, this alloy intervenes in a successful production of gas and it also provides a long useful life for those electrochemical plates. This material was chosen, despite not being an excellent electrical conductor, fulfills the required magnetic properties and with the energy efficiency standards in the production of gas, and due to issues of cost and profitability. The electrochemical plates 8 can also be manufactured of platinum.

With reference to the FIGS. 1 and 2, in the outer part of the set of electrochemical plates 8, there are two connectors 19 as part of the gas outlets to achieve a maximum flow of oxyhydrogen.

Figure 6:
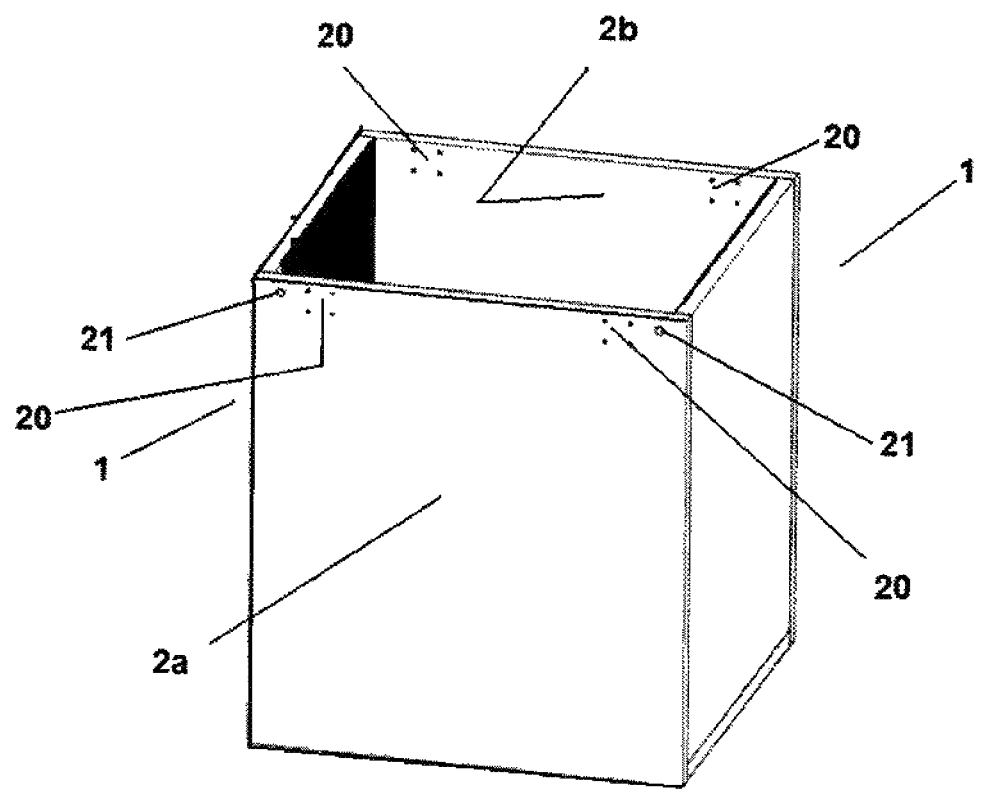
FIG. 6 shows a side view of the containment cabinet of the electrochemical reactor with connection points and other preparations for attaching the connection elements and placement of the upper covering cap.
Figure 7:
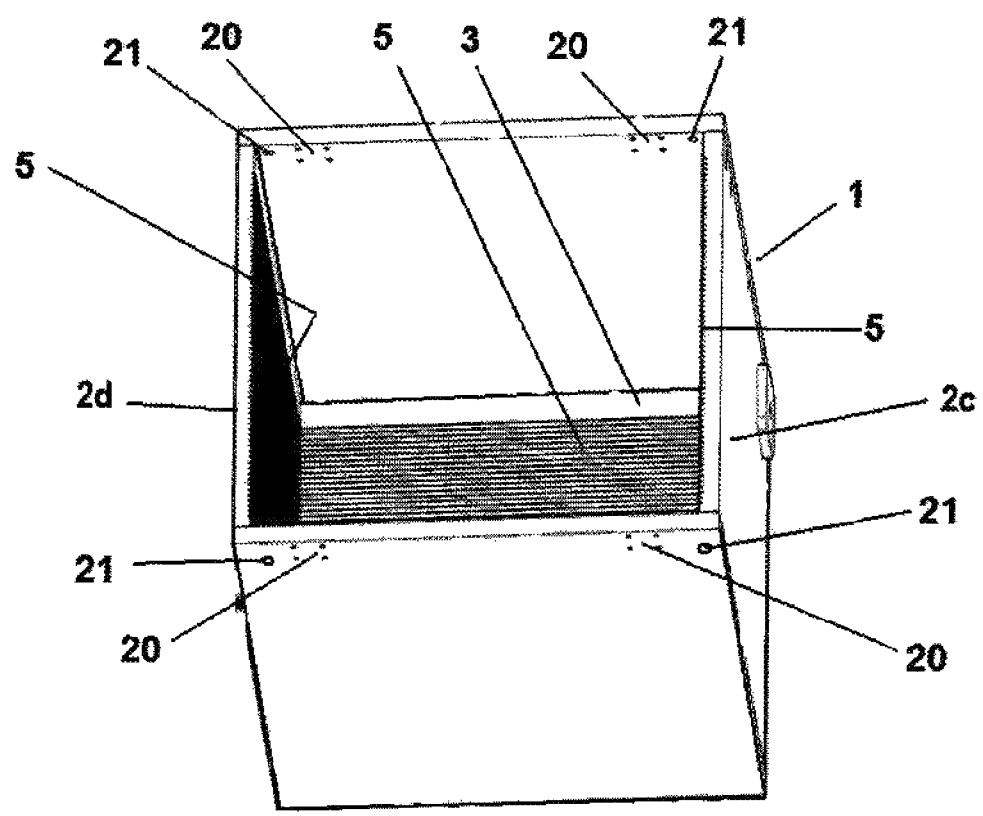
FIG. 7 shows a top view of the containment cabinet of the electrochemical reactor showing the interior ribbing of the opposite side walls and the bottom wall adapted to hold the electrodes at an equidistant from each other.

With reference to FIGS. 6 and 7, these fastening means 15 (see FIG. 1) engage in the drifted holes 20 placed in these opposing perimeter walls 2a and 2b of the container 1, and they allow to apply a sealing force between the top cover 13 (see FIG. 1) and the top edge of its perimeter walls 2a, 2b, 2c and 2d of the container 1 through a perimeter neoprene gasket (not shown). Also, the drilled holes 21 are shown in the upper area of the corners of the perimeter wall 2a for the connections of the electrical connecting copper rods 11.

Figure 5:
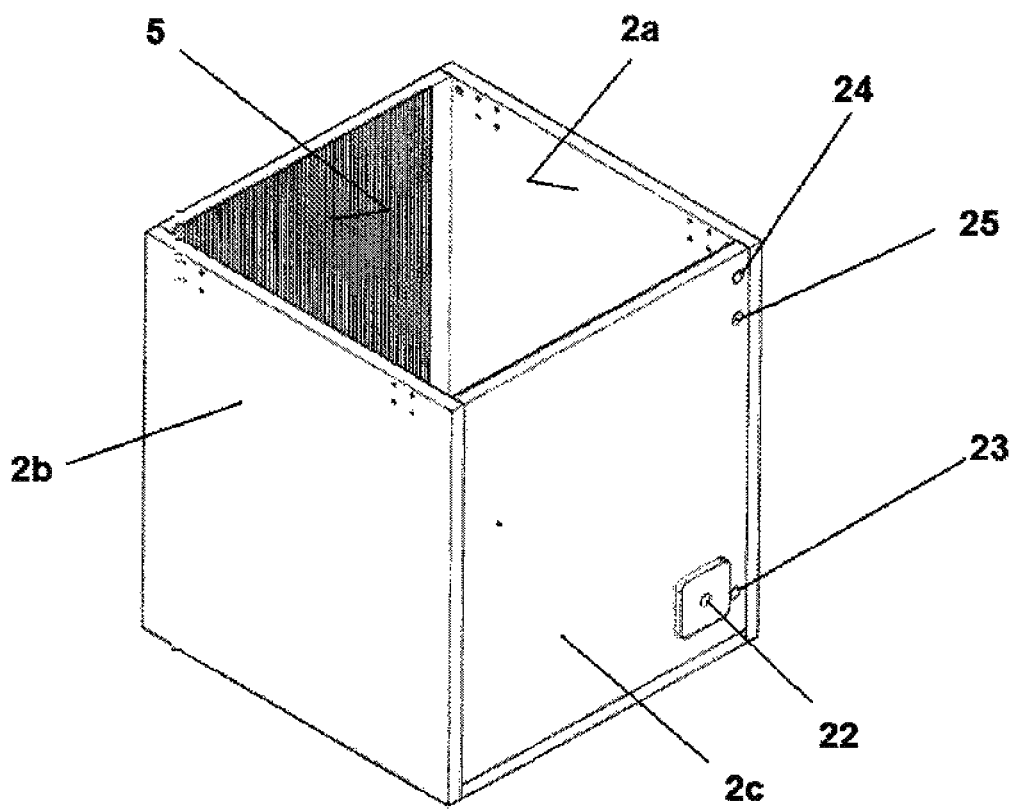
FIG. 5 illustrates a side perspective of the containment cabinet of the electrochemical reactor with holes made for connecting various auxiliary components.

With reference to FIG. 5, on one of the perimeter faces 2c of the container 1, there is a drilled hole 22 for installing a water level sensor (not shown) of the reactor that is placed in an individual cell of the first module at a height of 7 centimeters with respect to the interior of cell, to be used as a low level indicator through said drilled hole of the container; this allows the volume of liquid within the cells to autonomously operate before requiring a water refill.

The foregoing is possible because the level sensor operates optically, i.e. when the detecting element is covered with liquid, the sensor emits a signal to an electronic control that issues a report concerning the level, and if the detecting element is uncovered, it emits a different signal; it is important to note that the sensor must have chemical resistance and operating temperatures properties that are suitable for the type of application. The same side has a second adjacent drilled hole 23 where a temperature sensor can be installed (not shown); it is located in the first cell of the system that is always full with electrolyte. Then, the internal temperature is transmitted by conduction and convection to the sensitive element of the transducer that changes its internal resistance as a function of the detected temperature.

The same face has at the top a couple of drilled holes 24 and 25, the drilled hole 24 is used to connect a gas outlet duct, and the drilled hole 25 is used to connect a pressure sensor that is in direct contact with oxyhydrogen, and thanks to its stainless steel design with an internal insulation layer of silicone between the sensitive element and the surroundings, it is possible to make an extremely accurate measurement inside the highly corrosive environment of the reactor.

Figure 10A:
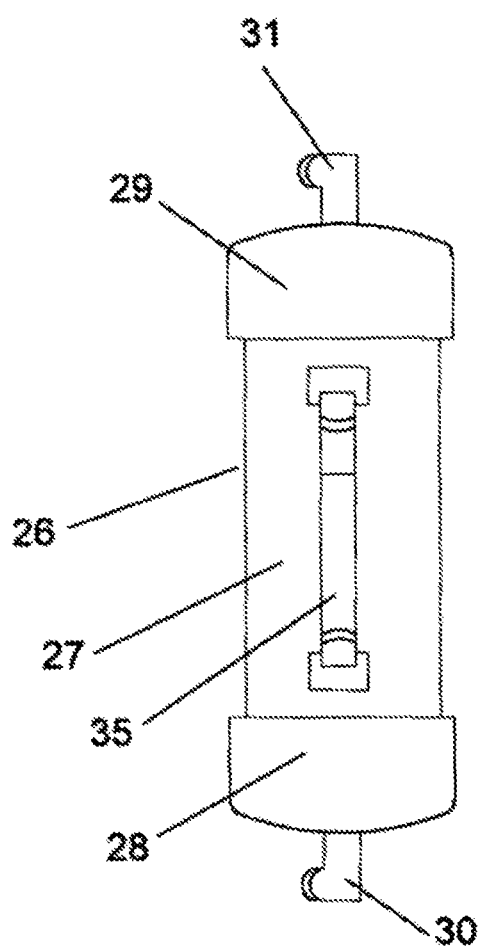
FIGS. 10*a* and 10*b* show a front view and a longitudinal section view of the cylinders used for filtering and as explosion safety for the electrochemical reactor according to this invention.
Figure 10B:
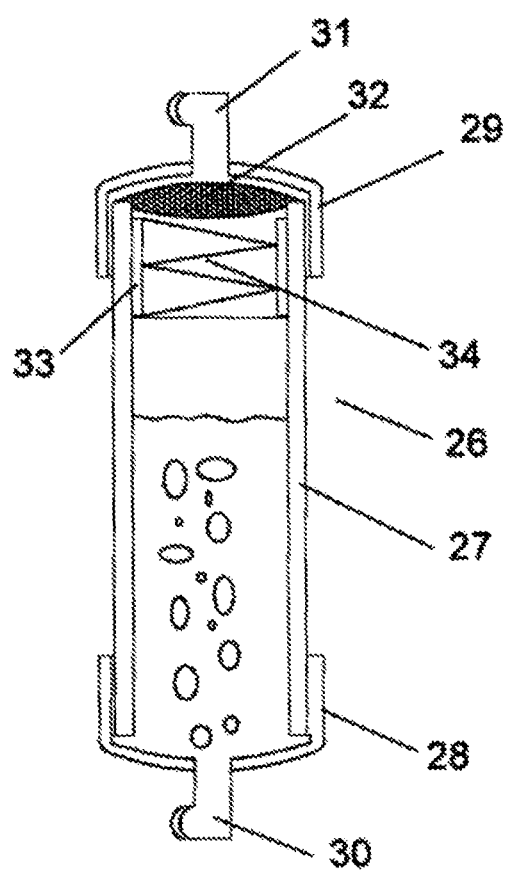

With reference to FIGS. 1, 5, 10a and b, the gas outlet duct (not shown) connected at the drilled hole 24 (see FIG. 5) connects to primary elements for anti-explosion safety 26 and filtered potassium hydroxide vapors that essentially consists of at feast one vertical sealed PVC cylinder cell 27 with a diameter of 7.63 cm (3 inches), in which water is contained up to a maximum level of ⅝ of its height.

The gas, which is a product of the reactor, is passed through the water. It generates bubbles that separate the continuous gas flow, i.e. independent bubbles are generated for a possible ignition event after the bubbling device; hence, the water between each bubble stops the gas from igniting.

The type of material that is used is guaranteed to contain an explosion of over 250 PSI, which is sufficient for these purposes because the combustion of the gas has a very special effect. When the gas fails to dissipate all the explosion energy, an implosion lasting only milliseconds after the primary explosion (experienced and filmed) occurs.

The sealed vertical cylinder 27 includes a lower lid 28 and an upper lid 29; which include connectors 30, 31 for the supply and discharge of the gas produced in the reactor. In 20, where said top lid 29 has a stainless steel mesh 32 or another material with similar properties, preferably 200 threads per 2.54 cm (1 inch), whose function is to filter any foam that might form. Under the mesh 32, there is a PVC tube 33 glued to the inner wall of the sealed vertical cylinder 27 with blades 34 in its interior whose purpose is to break waves. The sealed vertical cylinder 27 includes a level meter 35.

The bubble extractor height depends on the volume of gas circulating therein, e.g. for a flow volume of up to 20 LPM (Liters Per Minute), a height of 30 cm is sufficient. At least two of these systems are positioned; the first collects any potassium hydroxide residue from the gas, and the second mainly contains any ignition, and if it fails, the first is able to contain it.

The reactor also includes an air/particles filter system (not shown) to filter any particles exceeding 5 microns in diameter and of course the condensation contained in the gas. The lower part has a purge valve allowing the liquid to be drained when a filter is full. The materials used for manufacture are: polycarbonate for the container beaker, polypropylene for the filtering aspect and neoprene and/or nitrile for the packaging. All these materials are perfectly compatible with the elements that circulate inside (hydrogen, oxygen, potassium hydroxide and water).

The sensor elements are positioned strategically and are monitored and controlled by an electronic system 36 (see FIG. 1) which is also used to program the operational settings and to store the data collected.

The reactor is designed to be modular, i.e. it allows several to be connected together to obtain higher oxyhydrogen flows pursuant to the requirements of the application where the system is to be installed.

Figure 8:
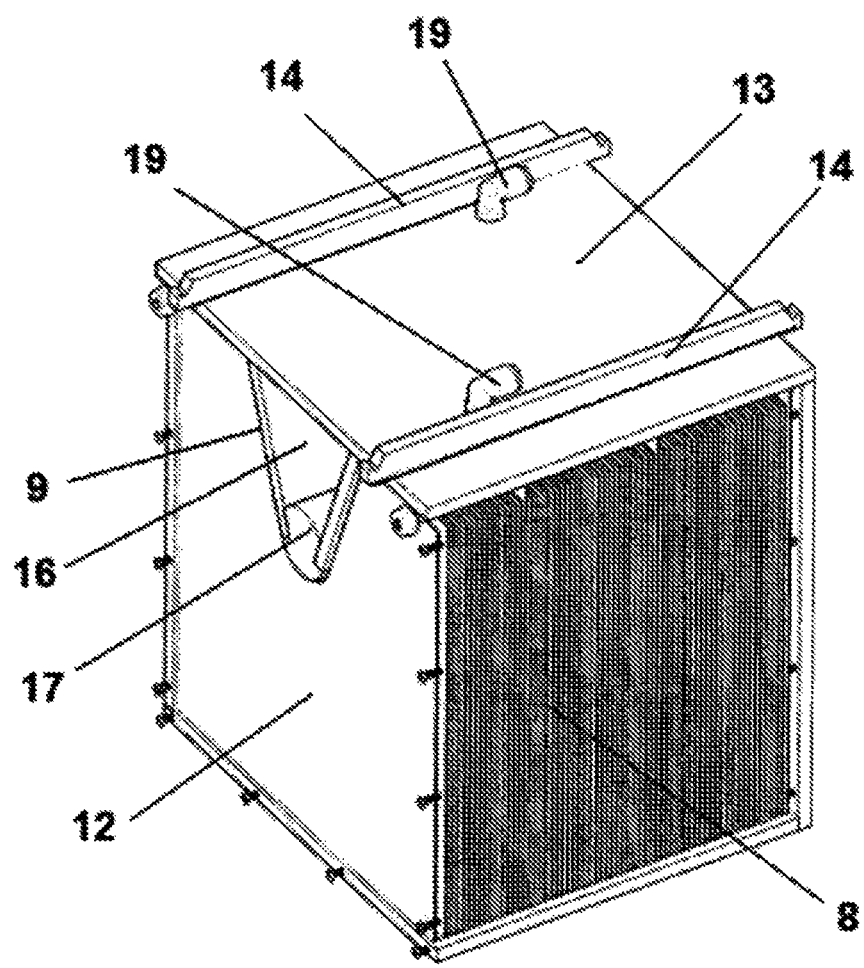
FIG. 8 shows a conventional perspective of the containment cabinet of the electrochemical reactor, without showing two perimeter walls added to illustrate the arrangement of the electrodes and the structure of the insulation beneath the upper covering cap.
Figure 9:
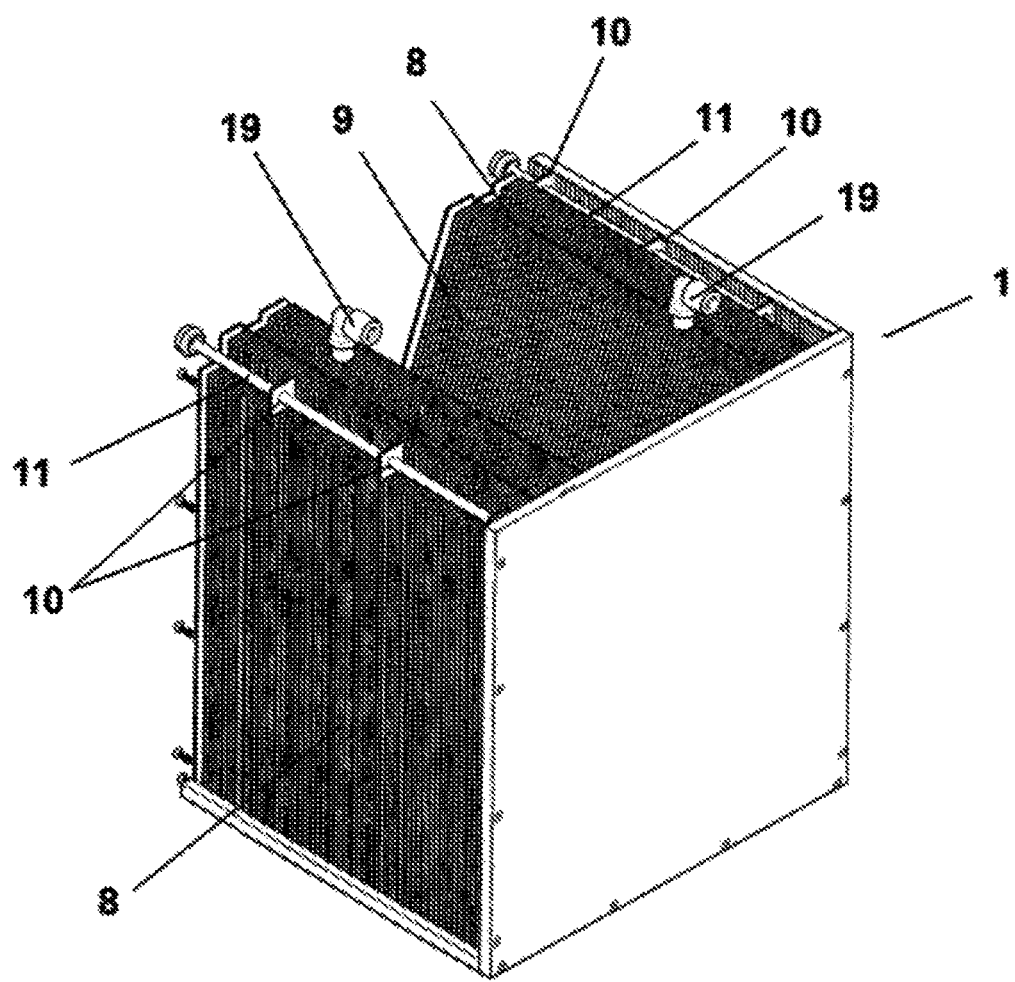

FIGS. 8 and 9 show the upper covering cap 13 attached to the upper part of the containment cabinet 1, covering the open upper face 4, showing the availability of the structural reinforcement bars and the availability of structural triangular projection 16 that defines a "V" shape with a cylindrical body 17 in the vertex that meets the central rabbets in "V" form 9 on the upper edge of such electrochemical plates 8, serving as internal isolation elements so that the cells remain isolated, even when foam is produced by the reaction, which ensures great efficiency in the use of electric power for the carve-out process. The copper electrical connection rods 11 can also be seen, fed by a power source (not shown). The invention has been described sufficiently to allow a person with average knowledge of the area to reproduce and obtain the results we mention for this invention. However, any capable person in the relevant technical field for this invention may able to make changes not described in this application, however, if, for the application of these changes in a certain system, the material claimed in the following claims is needed, such systems must be included within the scope of this invention.

The invention claimed is:

1. An electrochemical reactor to produce oxyhydrogen gas from water based on water electrolysis, comprising a watertight reactor formed by a cubic containment cabinet flooded with electrolyte, fitted with a series of conductive plates arranged in parallel form and separated among themselves, wherein said containment cabinet is defined by four perimeter walls and the upper part open where a volume of electrolyte solution comprising water and a catalyzer is stored; at least two opposing perimeter walls and the back wall include, in their internal wall, a plurality of equidistant stretch marks to be able to slide in a range of electrochemical plates, mainly rectangular, distributed in parallel form and equidistant from each, and that include a central rabbet in "V" form on the upper on the upper edge, optionally a rabbet enabling the effect of communicating vessels for overflows right in the rounded vertex of the "V" in the absence of the upper cover so that the electrochemical solution can be transferred into different cells defined between plate and plate; alternating electrochemical plates being adapted on both ends of the upper edge to fasten a pair of copper electric connection rods with connectors that protrude from the cabinet and fed from an electric power source, these electrochemical plates being fed from each other; an upper cover is fixed with fixing systems in the upper part of the cabinet, covering it, which includes, in its lower face, a triangular projection that defines a "V" form, which is available in the area defined by the central rabbets in "V" form on the upper side of such electrochemical plates, serving as an internal isolation element so that the cells are isolated; mounted fixing systems in the upper part of such opposing perimeter walls adapted to firmly fix the upper cover lid; in the outer part of the group of electrochemical plates, two connectors protrude from the lid as part of the oxyhydrogen gas release outlet; level sensor elements, temperature sensors, and pressure sensors that connect in the cabinet to monitor operating conditions; a connection for a primary gas outlet duct is implemented in one of the cabinet walls, such output duct being connected along with the two auxiliary ducts when the maximum gas flow is required, for primary anti-explosion safety and electrolyte solution catalyzer vapor/fume elements; an air particle filter system to filter any particle above 5 microns diameter and of course the condensation contained in the gas, where such sensors are positioned strategically and are monitored and controlled by an electronic system which is also used to program the operational settings and to store the data collected.

2. The electrochemical reactor to produce oxyhydrogen gas according to claim 1, further comprising isolation between electrochemical plate subsets, made up of the electrodes found between two electric connection electrochemical plates through the feeding rods, using neoprene separating gaskets with the same form as such electrochemical plates.

3. The electrochemical reactor to produce oxyhydrogen gas according to claim 1, wherein said cover includes a triangular project that defines a "V" shape with a cylindrical body in the vertex where such triangular project has in the area defined by the central rabbets in "V" shape in the upper edge of the electrochemical plates, serving as an internal isolation element; in the upper part of the lid, there is also a structural reinforcement bar positioned transversally.

4. The electrochemical reactor to produce oxyhydrogen gas according to claim 1, wherein said cover fixing means are mounted on the upper part of such opposing perimeter walls of the cabinet and consist of grips that exercise a sealing action between the upper cover and the upper perimeter edge of its cabinet perimeter walls, enabling airtight sealing without needing a tool to attach and position the cover.

5. The electrochemical reactor to produce oxyhydrogen gas according to claim 1, wherein said electrolyte solution catalyzer preferably consists of potassium hydroxide (KOH) with 99% purity, and a concentration of 7.79% for the total mixture mass.

6. The electrochemical reactor to produce oxyhydrogen gas according to claim 1, wherein said reactor water sensor level is located in an individual cell belonging to the first module, preferably 7 centimeters high with regard to the inner part of the cell, to enable the liquid volume of the cells to have a certain length of autonomous operating time before the water needs to be refilled.

7. The electrochemical reactor to produce oxyhydrogen gas according to claim 1, characterized in that such wherein said temperature sensor is installed on a cabinet wall and is available in the first cell system which is permanently full of electrolyte, and that via conduction and convection, the sensitive part of the transductor' s internal temperature is transmitted, which changes its internal resistance based on the temperature detected.

8. The electrochemical reactor to produce oxyhydrogen gas according to claim 1, wherein said anti-explosion and electrolyte solution catalyzer vapor and fume filter primary safety elements contain tap water up to a maximum of ⅝$^{THS}$ of its height; where the gas produced by the reactor passes through the water, generating independent bubbles that enable the continuous gas flow to be separated, in the event of ignition after producing bubbles, so that the water that exists between each bubble stops the gas ignition.

9. The electrochemical reactor to produce oxyhydrogen gas according to claim 1, wherein said vertical cylinders include a lower cover and an upper cover having input and output connectors for the gas produced in the reactor; in which such upper cover contains a stainless steel mesh preferably with 200 threads for each 2.54 cm or 1 inch, which functions to filter any foam formed, further comprising a PVC pipe, under said mesh, attached to the inner wall of the vertical cylinder, with one or more blades wherein said vertical cylinders further comprise a level measurer.

10. The electrochemical reactor to produce oxyhydrogen gas according to claim 1, wherein said electrochemical plates include a "V" shaped central rabbet on the upper side to allow the effect of communicating vessels in the filling operation and achieve adequate cell isolation when positioning the cover.

11. The electrochemical reactor to produce oxyhydrogen gas according to claim 1, wherein said electrochemical plates are preferably made up with an alloy of 0.03% carbon, 16% to 18% chromium, 10% to 14% nickel, and 2% to 3% molybdenum.

12. The electrochemical reactor to produce oxyhydrogen gas according to claim 1, wherein said electrochemical plates are preferably made from platinum or another material with similar properties.

13. The electrochemical reactor to produce oxyhydrogen gas according to claims 1, further comprising an air filtration system to filter any particle above 5microns in diameter and condensation; wherein said air filtration system further comprises a purge valve to drain the filter when said filter is full of water.

14. The electrochemical reactor to produce oxyhydrogen gas according to claim 1, wherein said plurality of substantially rectangular electrochemical plates are in parallel with a separation, preferably of 3 mm, between each plate, to enable contact between the electrolyte solution for the water-splitting reaction.

15. The electrochemical reactor to produce oxyhydrogen gas according to claim 1 wherein said electrochemical plates define a voltage differential in each cell preferably of 2.21 volts.

16. The electrochemical reactor to produce oxyhydrogen gas according to claim 8, wherein said vertical cylinders include a lower cover and an upper cover having input and output connectors for the gas produced in the reactor; in which such upper cover contains a stainless steel mesh preferably with 200 threads for each 2.54 cm or 1 inch, which functions to filter any foam formed, further comprising a PVC pipe, under said mesh, attached to the inner wall of the vertical cylinder, with one or more blades wherein said vertical cylinders further comprise a level measurer.

17. The electrochemical reactor to produce oxyhydrogen gas according to claim 3, wherein said electrochemical plates include a "V" shaped central rabbet on the upper side to allow the effect of communicating vessels in the filling operation and achieve adequate cell isolation when positioning the cover.

18. The electrochemical reactor to produce oxyhydrogen gas according to claim 2, wherein said electrochemical plates define a voltage differential in each cell preferably of 2.21 volts.

19. The electrochemical reactor to produce oxyhydrogen gas according to claim 5, wherein said electrochemical plates define a voltage differential in each cell preferably of 2.21 volts.

20. The electrochemical reactor to produce oxyhydrogen gas according to claim 11, wherein said electrochemical plates define a voltage differential in each cell preferably of 2.21 volts.

21. The electrochemical reactor to produce oxyhydrogen gas according to claim 12, wherein said electrochemical plates define a voltage differential in each cell preferably of 2.21 volts.

22. The electrochemical reactor to produce oxyhydrogen gas according to claim 14, wherein said electrochemical plates define a voltage differential in each cell preferably of 2.21 volts.

* * * * *